United States Patent Office 2,816,805
Patented Dec. 17, 1957

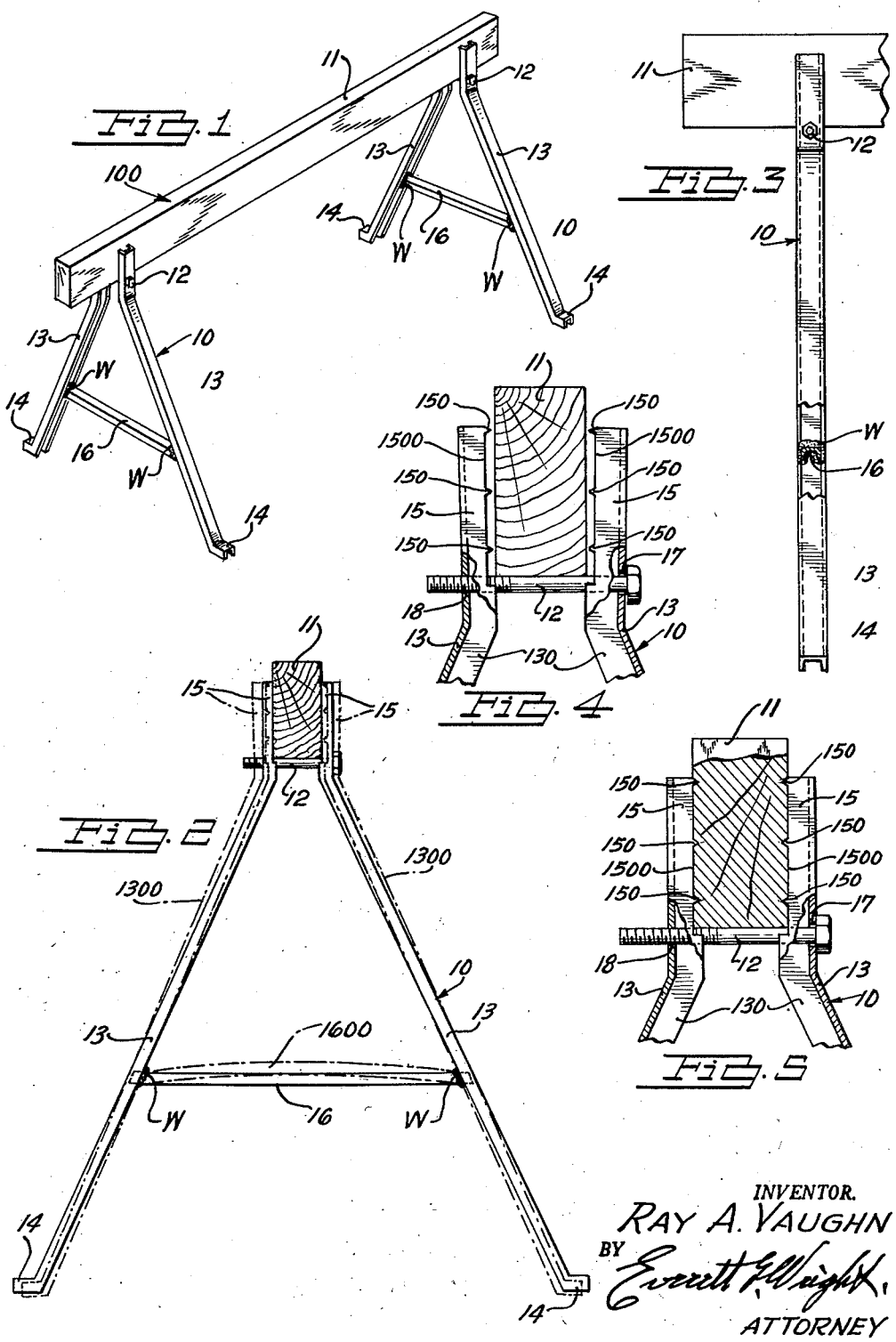

2,816,805
HORSE CONSTRUCTION

Ray A. Vaughn, Detroit, Mich., assignor to Ferro Stamping Company, a corporation of Michigan Application February 13, 1956, Serial No. 565,106

1 Claim. (Cl. 304—5)

This invention relates to horses of the type used by carpenters, plasterers, painters and other tradesmen, and in particular to horses that may be readily assembled for use and disassembled for economical shipment and storage.

The primary object of the invention is to provide a horse usable by carpenters as a saw horse or by other tradesmen such as plasterers or painters to support planks or other staging upon which to work consisting of metal frames which may be readily and positively attached to a stringer and easily removed therefrom to permit portability of the components in knock-down form, and the shipping and storage thereof in a minimum of space.

A further object of the invention is to provide a horse consisting of a stringer and a pair of A-frames, each A-frame being constructed to permit its springing responsive to a single securing element into the form required to receive the stringer and to engage the said stringer with a vise-like biting action.

A further object of the invention is to provide horses for tradesmen and others consisting of simple inexpensive A-frames and a wooden stringer which may be assembled and disassembled with a minimum of labor without nailing or bolting through the stringer, leaving the stringer undamaged except for slight indentations where gripped.

Still another object of the invention is to provide A-frames for knock-down horses composed of inturned channel legs and a strut fixed therebetween, the strut being relatively flexible to permit the said legs to be spread and contracted to accommodate them to a stringer supported on a stud disposed through said legs near the top thereof, the said top of said legs being formed to engage and grip the said stringer at spaced intervals both longitudinally and transversely thereof whereby to prevent relative movement of the A-frame and the stringer when the horses are assembled and in use.

Other objects of the invention will become apparent by reference to the following detailed description taken in connection with the accompanying drawing, in which:

Fig. 1 is a view in perspective showing a horse embodying the invention.

Fig. 2 is an enlarged end elevational view of the horse disclosed in Fig. 1 with a dot and dash line showing of the attitude taken by the legs and strut of an A-frame thereof when expanded at its top to receive the stringer thereof prior to assembly.

Fig. 3 is an enlarged side elevational view.

Fig. 4 is a detailed sectional view of the top of an A-frame spread by the securing stud to receive the stringer prior to assembly, the stringer being supported on the said stud.

Fig. 5 is a detailed sectional view similar to Fig. 4 showing the top of A-frame drawn by the securing stud into a vise-like engagement with the stringer, the stringer preferably continuing to be supported on the securing stud.

Referring now to the drawing wherein like numerals refer to like and corresponding parts throughout the several views, the horse 100 disclosed for the purpose of illustrating the invention comprises a pair of A-frames 10 supporting a stringer 11, each said A-frame 10 including a stringer securing or clamping stud 12 onto which the stringer 11 is supported and by means of which the A-frames 10 are clamped in vise-like biting engagement with the stringer in a manner to prevent relative movement between the A-frames 10 and the stringer 11. Obviously, for long horses and heavy loads, more than two A-frames 10 may be employed.

Each A-frame 10 is preferably constructed of two outwardly and downwardly sloping channel shaped legs 13 having a horizontal foot 14 and a substantially vertical top grip portion 15, the flanges 130 of the channel shaped legs 13 being faced inwardly. About midway between the feet 14 and the grip portions 15 of the legs 13 of each A-frame 10 is a horizontally disposed strut 16. The said strut 16 is preferably of channel shaped cross section and nests between the flanges 130 of the A-frame legs 13, the ends of the said strut 16 being rigidly welded at W to the said A-frame legs 13. The clamping or securing stud 12 telescopes through an aperture 17 in one of the said A-frame legs 13 and is threaded through the opposite leg at 18, the said stud being disposed horizontally through the lower portion of the top grip portions 15 of the A-frame legs 13 as best shown in Figs. 4 and 5. The flanges 130 of the channel shaped legs 13 are cut away at 1500 at the top grip portion 15 to provide a plurality of vertically and horizontally spaced prongs 150 above the stud 12.

In assembling a horse 100, the stud 12 of each A-frame 10 is turned counterclockwise to spread the grip portion 15 of each A-frame leg 13 as shown in Fig. 4 whereupon the strut 16 thereof bows, the strut 16 and the legs 13 of each A-frame 10 taking the position shown by the dot and dash lines 1600 and 1300 respectively in Fig. 2. Therefore, it is important that the struts 16 be sufficiently flexible to permit such bowing whereby to eliminate undue stresses on the welds W. After the grip portions 15 have been spread as shown in Fig. 4, the stringer 11 is positioned onto the stud 12 of each A-frame 10. The said studs 12 are then turned clockwise to draw the grip portions 15 of each A-frame 10 into a vise-like biting engagement in respect to the stringer 11 with vertically and horizontally spaced prongs 150 thereof embedded into the stringer 11 and with the cutaway portions 1500 of said flanges 130 of the channel shaped legs 13 at the top grip portion 15 thereof in substantial bearing against the sides of the stringer 11.

Although but a single embodiment of the invention has been disclosed and described herein, it is obvious that many changes may be made in the size, shape, arrangement and detail of the various elements thereof, all without departing from the spirit and scope of the invention as defined by the appended claim.

I claim:

A horse of the class described comprising a wooden stringer and A-frames, each A-frame including a pair of outwardly sloping legs and a transverse strut rigidly fixed thereto, the said strut being of greater flexibility in the plane of said legs than said legs permitting it to flex when the upper ends of said legs are spread apart to receive said stringer, the upper ends of said A-frame legs being formed to provide generally vertically disposed grip portions including prongs to grip said stringer with a vise-like biting engagement when clamped thereagainst whereby to prevent relative movement between said A-frame and said stringer, and a clamping means transversely disposed through said grip portions adapted to support said stringer and pull said grip portions in said vise-like biting engagement therewith.

References Cited in the file of this patent

UNITED STATES PATENTS

| | | |
|---|---|---|
| 1,462,707 | Lawlor | July 24, 1923 |
| 1,530,965 | Wild | Mar. 24, 1925 |
| 1,936,196 | Kacena | Nov. 21, 1933 |
| 1,960,991 | Young | May 29, 1934 |
| 2,161,239 | Thomson | June 6, 1939 |
| 2,194,027 | McDonald | Mar. 19, 1940 |
| 2,261,217 | Bond | Nov. 4, 1941 |
| 2,373,485 | Long | Apr. 10, 1945 |
| 2,793,916 | Woods | May 28, 1957 |

FOREIGN PATENTS

| | | |
|---|---|---|
| 358,332 | Great Britain | Oct. 8, 1931 |